June 30, 1931.  A. ACKERMAN  1,812,672
LIME KILN
Filed Jan. 24, 1928  3 Sheets-Sheet 1

INVENTOR.
Arthur Ackerman
BY James L. Stewart
ATTORNEYS.

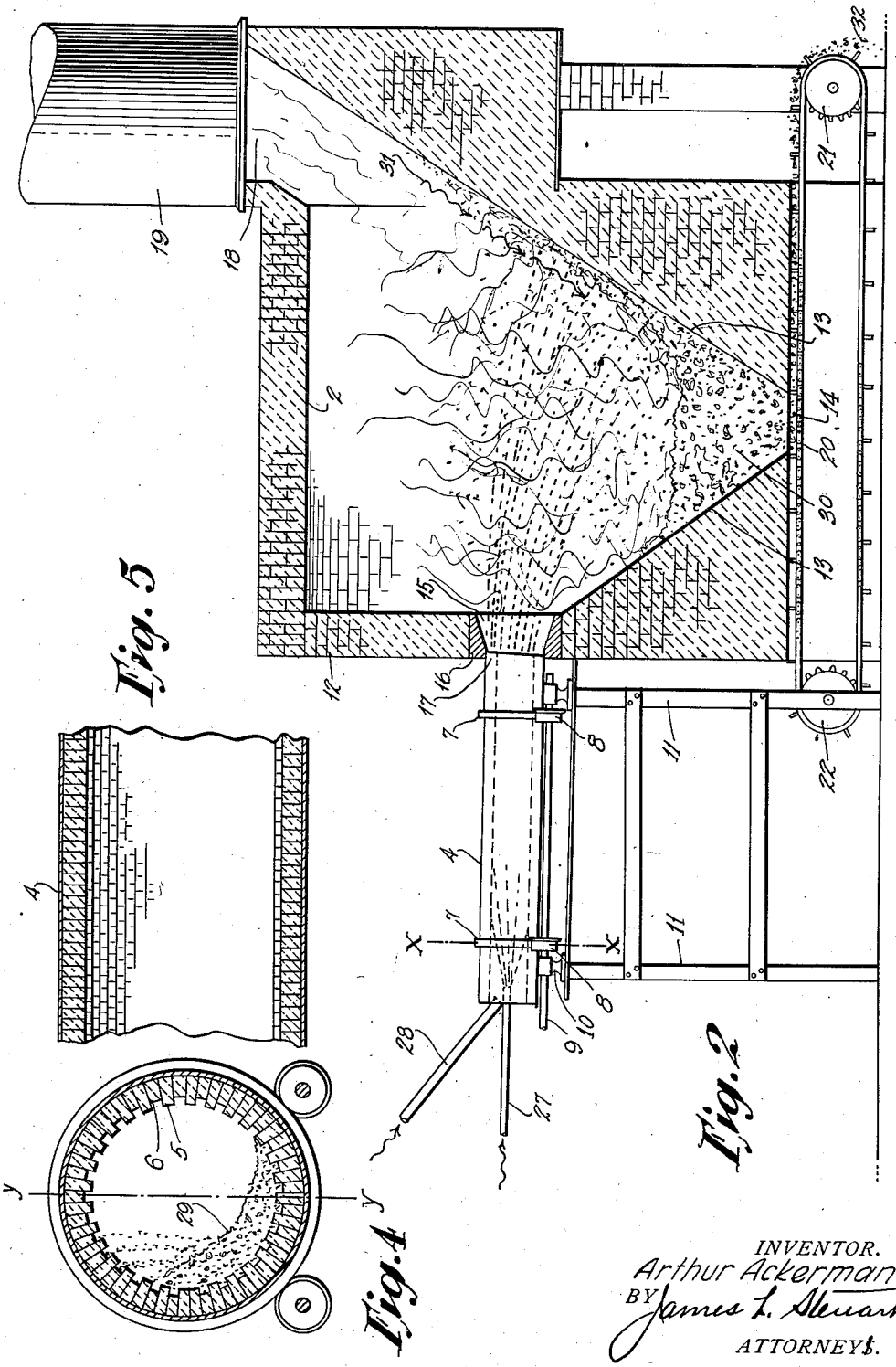

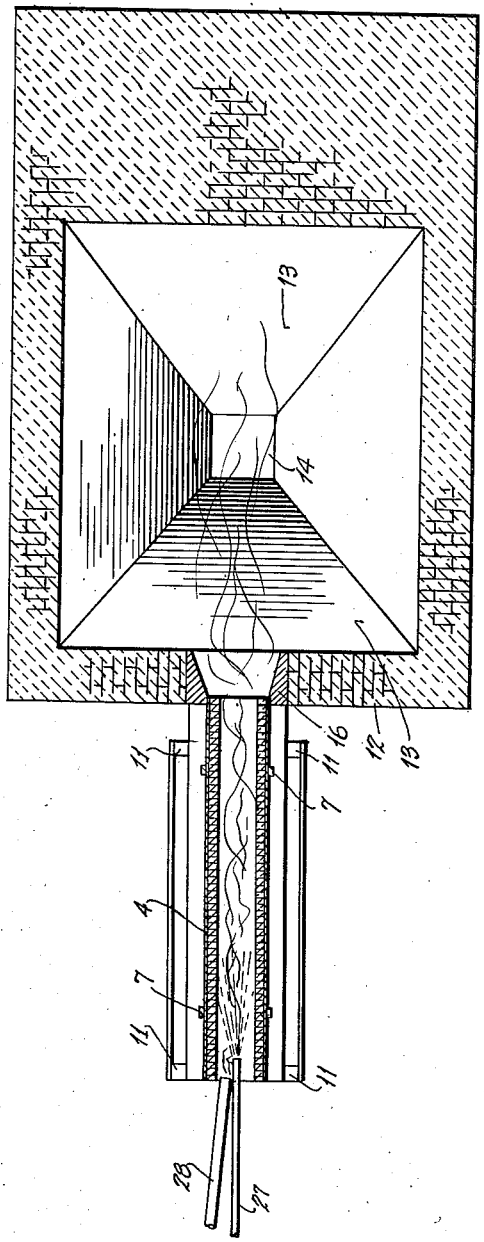

Patented June 30, 1931

1,812,672

UNITED STATES PATENT OFFICE

ARTHUR ACKERMAN, OF NEW YORK, N. Y.

LIME KILN

Application filed January 24, 1928. Serial No. 249,018.

This invention relates to a method of calcining carbonate of lime as found in nature. It is particularly adapted for the calcining of such products when the same are so finely divided that the particles subjected to the burning operation are liable to be suspended in the gases of combustion and carried off through an exhaust flue to the atmosphere.

One of the objects of the process is, therefore, to provide a stage in the process where the gases en route to an exhaust flue will pass through the dome of a burning and settling chamber with a relatively slow movement so that said particles held in suspension by said gases will be affected by the force of gravity to cause them to separate from said gases and to fall into a receptacle at the base of said chamber.

Another object is to provide a closed chamber into which said finely divided product will be caused to accumulate and where it will continue to burn until the calcining process is fully accomplished.

The chamber is lined with fire brick which when heated radiates sufficient heat to maintain combustion within its boundaries, said chamber being sealed except at the point where the partly calcined product and gases of combustion are delivered thereto, such point being adjacent its top or dome, and except at a point opposite said point of delivery where an exhaust flue or chimney is connected therewith to carry off the spent gases to the atmosphere.

The calcined product may be extracted or drawn off from the base of said chamber. It is important, however, that such withdrawal aperture should be at all times choked with lime so that no air may enter.

The accompanying drawings illustrate an apparatus adapted for use in performing said process, but the form of apparatus is immaterial so long as the several steps incident to the process are taken with any apparatus suitable for the purpose.

It is also important in the operation of the process to maintain a balance between the amount of material fed to the kiln and the degree of heat employed in the initial stages of combustion and the degree of heat maintained within the chamber, so that a uniform operation of calcining may be maintained.

The parts of said apparatus are indicated by numerals, like numerals referring to like parts.

Figure 2 is a vertical section through the center of said apparatus.

Figure 3 is a horizontal section thereof.

Figure 4 is a vertical section of the rotary kiln taken on the line $x$—$x$ of Figure 2.

Figure 5 is a vertical section taken on the line $y$—$y$ of Figure 4, omitting the product under treatment.

Figure 1:
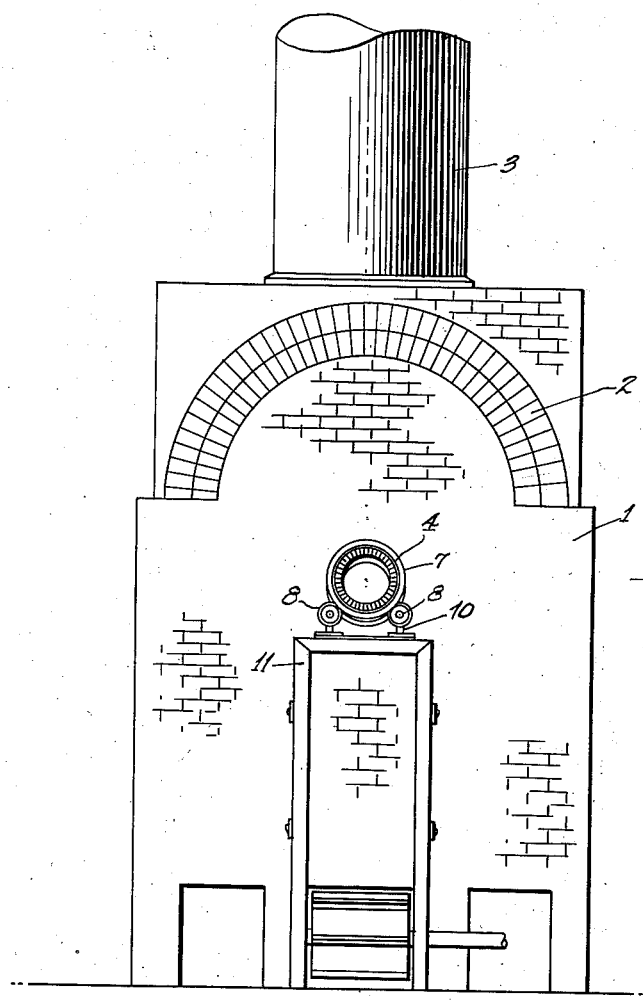
Figure 1 is an elevation showing a front view of the apparatus for practicing this invention.
Figures 6, 7:
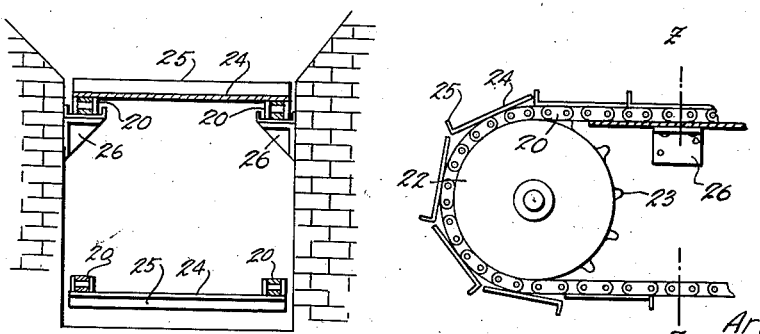
Figure 6 is a side elevation of conveyor means.
Figure 7 is a vertical section of said conveyor means shown in Figure 6, taken on the line $z$—$z$ of Figure 6.

1 is the front wall of a chamber, while 2 is an arch forming the dome thereof. 3 is a chimney. 4 is a cylindrical rotary kiln open at both ends, and preferably lined with fire brick 5. These bricks are preferably arranged in serrated relation so that alternate bricks are of different dimensions measured in the radii of said cylindrical element 4, 5 being a long brick and 6 a short brick. This kiln 4 is provided with two annular tracks 7 and 7, adapted to cooperate with bearings wheels 8 and 8, which are mounted on the shafts 9, said shafts running in suitable bearings 10, 10, said bearings being suitably supported on a framework 11, 11. The kiln 4, it will be noted, is mounted at an angle to a horizontal plane with its inclination towards the fixed chamber 12.

Said fixed chamber is preferably built in a substantial way and lined with fire brick. Its internal construction is exhibited in the drawings, wherein it is topped with an arch or dome 2, and the bottom thereof is in the form of a rectangular funnel as 13, 13, with an aperture at the base thereof designated as 14. It is also provided with another aperture in the front section 15. The aperture 15 is provided with the bearing 16 adapted to receive one end 17 of the rotary kiln 4, so constructed that it will support said end of said kiln 4, and at the same time permit a rotation thereof within said bearing. A third aperture in said chamber at 18 leads to a chimney 19 exhausting to the atmosphere. The aperture 14 in the base of the funnel 13 is closed by a continuous chain conveyor 20, which is mounted between two pulleys 21 and 22, each of said pulleys being provided with suitable sprockets 23 adapted to cooperate with said chain conveyor. 24, 24 are plates suitably attached to said chain conveyor and provided with right-angular flanges 25; said chain conveyor is preferably supported by suitable brackets as 26, 26.

One or both of the shafts 9 are caused to rotate at a predetermined rate of speed by means not shown. 27 is a diagrammatic illustration of means for introducing elements of combustion into the kiln 4 under compression. The tube 28 is a diagrammatic illustration of means for feeding finely divided carbonate of lime to one end of the cylindrical kiln 4. It is preferable that this delivery of the product to be calcined be directed at one side of the point at which the elements of combustion are introduced.

The process of this invention is accomplished through the medium of the apparatus described as follows: A rotary kiln 4 is caused to rotate by the application of power to the shaft 9, such rotation being at a predetermined rate, preferably at a relatively slow rate of rotation. Elements of combustion, such as oil or gas in association with air, are projected into the kiln 4 through the tube 27 and are thus caused to traverse the rotary kiln 4 and are ultimately delivered into the fixed chamber 12 as indicated. The finely divided particles of carbonate of lime are introduced by any suitable means into the kiln 4 at the same end with the elements of combustion but preferably, as stated, to one side thereof; that is to say, not directly within the flame as projected into the kiln 4,—the reason for this being that it is found that when the light particles of carbonate of lime are directly attacked by the gases and elements of combustion, they will be projected too far within the rotary kiln to be satisfactory. It is therefore preferable that such product be delivered behind or to one side of the gas stream.

As previously stated, the rotary kiln 4 is mounted at an angle to a horizontal plane, so that its inclination is towards the fixed chamber 12. This angle may be more or less, as the circumstances of the case require, but preferably it is slightly inclined, the object of such inclination being primarily to cause a gentle flow of the finely divided carbonate of lime through the cylindrical kiln and towards the fixed chamber, such movement being accomplished by the mechanical rotation of the kiln, and also by the fact that the product is lifted and caused to fall by said serrated fire brick lining, and with each rotation the material falls one degree further towards the discharge end of the rotary kiln.

In Figure 4 a vertical section of the rotary kiln 4 is shown as lined with fire brick or other fire resisting lining, and it has been found preferable to make this lining in serrated form, the serrations operating more or less as conveyor plates, so that with the rotation of the kiln 4 the finely divided carbonate of lime will be carried up, broken and caused to fall down, as graphically illustrated in said Figure 4 at 29. By this means the finely divided carbonate of lime within the rotary kiln 4 is prevented from accumulating in masses, under which condition it would not be as directly affected by the elements of combustion. The rotation of the kiln and the operation of the serrated surface thereof cause the said accumulated masses to be broken up and the divided particles to be more or less directly exposed to the elements of combustion.

It is desirable that the flow of the carbonate of lime through the rotary kiln be accomplished at a slow rate of speed, and therefore it is preferable that the elements of combustion projected into the kiln be under control, and also that the supply of finely divided carbonate of lime be in like manner under control, for it has been found that the burning of the residue coming from the rotary kiln as it falls into the fixed chamber operates more efficiently under certain conditions of feed, that is to say, it is important that the product passing through the rotary kiln should not be fed to the fixed chamber too rapidly. Consequently an appropriate balance may be established between said feeds to the rotary kiln with relation to the consumption of the carbon in the fixed chamber, so as to produce a calcium product liberated from its carbon association of a purer quality when said balanced relation of feed and consumption is established and maintained.

In the course of the above operation, the carbonate of lime will be more or less calcined and will ultimately be delivered in association with the gases under combustion into the stationary chamber through the aperture 17.

It has been observed that the result of the passage of the carbonate of lime through the kiln 4 is that certain of the particles of the carbonate of lime are delivered into the chamber in such form that they will fall into the funnel 13, whereas other finely divided particles of carbonate of lime will be suspended within the gaseous atmosphere of the chamber. As previously stated, one of the difficulties in calcining said finely divided carbonate of lime is that a considerable part of the finely divided product will be held in suspension in a gaseous atmosphere and carried off through an exhaust flue to the atmosphere,—hence a material waste resultant from this fact. One of the objects of this invention is to confine the gases of combustion carrying said suspended particles of carbonate of lime within a sealed chamber for sufficient time to permit such particles to separate themselves from the gaseous flow under the power of gravity and to fall to the base of the chamber. It will be noted that a substantial distance is provided between the intake of the fixed chamber at 17 and the exhaust for the gases through the port 18. It has been found that during the passage of these gases through the dome of the chamber, a high percentage of the suspended particles carried by the gases will fall into the base of the chamber, thus accomplishing one of the desirable results anticipated.

As previously stated, the hopper 13 has an aperture at its base which is closed by the traveling belt 20. As the calcination proceeds, the hopper will become more or less filled with lime freed from its association with carbon, that is to say, reduced to more or less pure calcium oxide as indicated at 30. This accumulation of lime within the hopper will operate in association with the traveling belt to close the aperture 14 against the passage of air. As previously stated, the fixed chamber is lined with fire brick which in the operation of the apparatus becomes incandescent, and as the partially calcined product falls into the fixed chamber, as indicated in dotted lines, it will fall to the base of the internal hopper of the chamber, as indicated by the arrows 31. If the carbon associated with the lime has not all been consumed, the burning will continue within the chamber until all of the carbon is burned off. The gases free from finely divided elements in suspension will pass out through the chimney 19. The calcined lime lying at the base of the hopper 13 may be drawn off at predetermined intervals, or the feed may be continuous by the rotation of the pulleys 21 and 22, by suitable means not shown, so that as said feed passes beneath the aperture 14 and on to the plates 24, the right-angular bend of such plates as 25 will cause the lime to be carried by said belt conveyor and fed forward until it drops into a suitable receptacle as 32.

It has been found that it is possible to so coordinate the feed of the elements of combustion and the finely divided carbonate of lime as to establish a balance between the product delivered to the fixed chamber, so that the carbon associated with the lime will be completely consumed in the operation above described, and the gases passing out through the chimney will be practically free of said finely divided product. Hence the process may be so balanced that it will be a continuous process or method adapted for the burning of carbonate of lime with the certainty that a pure calcium or lime will be produced.

Claims:

1. The method of calcining finely divided carbonate of lime, which consists in concurrently passing the material to be treated and combustible fuel through a rotary kiln in the same direction with the fuel in a state of combustion to effect a partial burning of said material, delivering the resulting solid and gaseous products from the rotary kiln into a settling and burning chamber to thereby permit the solids in suspension to settle out from the gases while said solids continue to burn, completing the burning operations on the material in the chamber due to the residual heat of said materials and of the chamber, and permitting the exit of waste gaseous products from the chamber at a point sufficiently remote from the point of entry of the solid and gaseous products into the chamber from the rotary kiln to preclude the outgoing gaseous products from entraining and carrying off finely divided material entering the chamber from the rotary kiln.

2. The method of calcining finely divided carbonate of lime, which consists in projecting flaming combustible fuel longitudinally through a rotary kiln to a settling and burning chamber, introducing the material to be treated into the rotary kiln in a position exterior to the blast of flame but at the same end of the kiln from which the flame is projected, causing such material to travel longitudinally of the kiln toward the chamber to subject the material to contact with the flame with consequent partial burning of the material, delivering the resulting solid and gaseous products from the kiln into the chamber to thereby permit the solids in suspension to settle out from the gases while the solids continue to burn, completing of the burning operations on the material in the chamber due to the residual heat of said materials and of the chamber and allowing the waste gaseous products to exit from the chamber at a point sufficiently remote from the point of entry of the solids and gaseous products into the chamber from the rotary kiln to preclude the outgoing gaseous products from entraining and carrying off finely divided material entering the chamber from the rotary kiln.

Signed by me at New York, this 23rd day of January, 1928.

ARTHUR ACKERMAN.